United States Patent
Li et al.

(10) Patent No.: US 11,315,445 B2
(45) Date of Patent: Apr. 26, 2022

(54) MOBILE TERMINAL, ANTENNA CONTROL METHOD AND STORAGE MEDIUM

(71) Applicant: BEIJING XIAOMI MOBILE SOFTWARE CO., LTD., Beijing (CN)

(72) Inventors: Peng Li, Beijing (CN); Gaocai Han, Beijing (CN); Xuwang Cui, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/690,094

(22) Filed: Nov. 20, 2019

(65) Prior Publication Data

US 2021/0020076 A1   Jan. 21, 2021

(30) Foreign Application Priority Data

Jul. 17, 2019   (CN) .......................... 201910646231.2

(51) Int. Cl.
*G09F 9/30* (2006.01)
*G06F 1/16* (2006.01)
*H01Q 1/24* (2006.01)

(52) U.S. Cl.
CPC ............ *G09F 9/301* (2013.01); *G06F 1/1652* (2013.01); *H01Q 1/244* (2013.01)

(58) Field of Classification Search
CPC ....... G03B 21/58; G09F 9/301; G06F 1/1652; H01L 2251/5338; H01Q 1/224; H01Q 1/244; H01Q 1/22
See application file for complete search history.

(56) References Cited

U.S. PATENT DOCUMENTS

| 9,964,995 | B1 | 5/2018 | Morrison et al. |
| 10,615,485 | B2* | 4/2020 | Chun ........................ H01Q 1/44 |
| 2003/0109286 | A1 | 6/2003 | Hack et al. |
| 2006/0118625 | A1 | 6/2006 | Sekita |
| 2014/0194165 | A1 | 7/2014 | Hwang |

(Continued)

FOREIGN PATENT DOCUMENTS

| CN | 1671154 A | 9/2005 |
| CN | 103873670 A | 6/2014 |

(Continued)

OTHER PUBLICATIONS

International Search Report in PCT/CN2019/111318 dated Apr. 9, 2020.

(Continued)

*Primary Examiner* — Christopher E Mahoney
(74) *Attorney, Agent, or Firm* — Syncoda LLC; Feng Ma

(57) ABSTRACT

A mobile terminal includes a body, and a flexible display screen disposed on the body. The flexible display screen is configured to be switched between an expanded state and a retracted state. A primary antenna is disposed within the body, and a spare antenna for replacing the primary antenna is disposed at an edge of the flexible display screen. The method includes: controlling the primary antenna to be in a working state and the spare antenna to be in a non-working state when the flexible display screen is in the retracted state; and controlling the primary antenna to be in a non-working state and the spare antenna to be in a working state when the flexible display screen is in the expanded state.

14 Claims, 13 Drawing Sheets

(56) References Cited

U.S. PATENT DOCUMENTS

| | | |
|---|---|---|
| 2014/0240178 A1 | 8/2014 | Chun et al. |
| 2015/0090044 A1 | 4/2015 | Hwang et al. |
| 2015/0277496 A1 | 10/2015 | Reeves et al. |
| 2017/0103735 A1 | 4/2017 | Oh et al. |
| 2017/0294705 A1 | 10/2017 | Khripkov et al. |
| 2018/0034130 A1* | 2/2018 | Jang .................... H01Q 1/2266 |
| 2018/0324964 A1* | 11/2018 | Yoo .......................... E05D 3/18 |
| 2018/0358684 A1 | 12/2018 | Chun et al. |
| 2019/0103656 A1 | 4/2019 | Shi et al. |
| 2019/0121396 A1* | 4/2019 | Ha .......................... G06F 1/183 |
| 2019/0261519 A1* | 8/2019 | Park .................. G02F 1/133305 |
| 2020/0076065 A1* | 3/2020 | Zhou ...................... H01Q 1/243 |

FOREIGN PATENT DOCUMENTS

| | | |
|---|---|---|
| CN | 104539764 A | 4/2015 |
| CN | 108024444 A | 5/2018 |
| CN | 108039569 A | 5/2018 |
| CN | 108347759 A | 7/2018 |
| CN | 108594934 A | 9/2018 |
| CN | 108810204 A | 11/2018 |
| CN | 109167151 A | 1/2019 |
| CN | 109167153 A | 1/2019 |
| CN | 109725680 A | 5/2019 |
| JP | 2014531796 A | 11/2014 |
| KR | 20040072652 A | 8/2004 |
| KR | 100818170 B1 | 4/2008 |
| KR | 20140105886 A | 9/2014 |
| KR | 20170024942 A | 3/2017 |
| KR | 20170048007 A | 5/2017 |
| KR | 20170050270 A | 5/2017 |
| KR | 20170062327 A | 6/2017 |
| KR | 20170141438 A | 12/2017 |
| RU | 2683290 C2 | 3/2019 |
| WO | 2017070435 A1 | 4/2017 |

OTHER PUBLICATIONS

First Office Action in 10-2019-7033651 dated May 29, 2020.
RU Office Action in Application No. 2019139068/07, dated Jun. 18, 2020.
Extended European Search Report in Application No. 20163355.9, dated Dec. 21, 2020.
CN First Office Action in Application No. 201910646231.2, dated Mar. 23, 2021.
Korea Notice of Allowance in Application No. 10-2019-7033651, dated Jan. 28, 2021.
WIPO International Search Report in Application No. PCT/CN2019/111318, dated Apr. 9, 2020.
Japan 1st Office Action in Application No. 2019-562613, dated Nov. 17, 2021.
India 1st Office Action in Application No. 201927048875, dated Feb. 22, 2022.

* cited by examiner

MOBILE TERMINAL, ANTENNA CONTROL METHOD AND STORAGE MEDIUM

CROSS-REFERENCE TO RELATED APPLICATION

This application claims priority to Chinese Patent Application No. 201910646231.2 filed on Jul. 17, 2019, the disclosure of which is hereby incorporated by reference in its entirety.

BACKGROUND

Flexible display screens with properties such as arbitrary bending and good flexibility have been adopted by many mobile terminals.

For a mobile terminal employing the flexible display screen, the flexible display screen may be expanded to enlarge the screen area when the mobile terminal is used, the flexible display screen may be retracted to reduce the screen area when the mobile terminal is carried, and the size of the flexible display screen is selected according to use environments, so as to make the mobile terminal more convenient.

SUMMARY

The present disclosure relates generally to a field of mobile terminals, and in particular, to a mobile terminal, an antenna control method, and a storage medium.

Various embodiments of the present disclosure provide a mobile terminal, an antenna control method and a storage medium, which can solve a problem that the antenna performance is reduced due to the change of a state of a flexible display screen. The technical solution is exemplified as follows.

According to one aspect of the present disclosure, a mobile terminal is provided, including a body and a flexible display screen disposed on the body;

wherein the flexible display screen is configured to be switched between an expanded state in which the flexible display screen is expanded to a first area and a retracted state in which the flexible display screen is retracted to a second area, and the first area is larger than the second area.

a primary antenna is disposed within the body, and a spare antenna for replacing the primary antenna is disposed at an edge of the flexible display screen.

In some embodiments, the flexible display screen is rectangular, and a first rectangular edge of the flexible display screen is secured to the body; and the spare antenna is disposed on at least one of a second rectangular edge, a third rectangular edge, or a fourth rectangular edge of the flexible display screen.

The rectangle can be a rectangle, or a rounded rectangle.

In some embodiments, the flexible display screen is rectangular, a central portion of a second rectangular edge of the flexible display screen is secured to the body, and a central portion of a fourth rectangular edge of the flexible display screen is secured to the body; the second rectangular edge and the fourth rectangular edge are two parallel rectangular edges; and the spare antenna is disposed on at least one of the first rectangular edge, the second rectangular edge, the third rectangular edge, or the fourth rectangular edge of the flexible display screen.

In some embodiments, the primary antenna includes at least one of a main antenna, a diversity antenna, a Global Positioning System (GPS) receiving antenna, or a Wireless Fidelity (Wi-Fi) antenna.

In some embodiments, the spare antenna includes one or more primary antennas.

In some embodiments, a control module is further disposed within the body; the control module is respectively connected with the primary antenna and the spare antenna; and the control module is configured to control the primary antenna to be in a working state and control the spare antenna to be in a non-working state when the flexible display screen is in the retracted state; and control the primary antenna to be in a non-working state and control the spare antenna to be in a working state when the flexible display screen is in the expanded state.

In some embodiments, the control module is configured to control the flexible display screen to be in the retracted state or in the expanded state according to a type of a foreground application.

In some embodiments, the body is provided with a state detection component thereon; the control module is connected with the state detection component; and the control module is configured to determine whether the flexible display screen is in the retracted state or in the expanded state according to a signal output by the state detection component.

In some embodiments, the state detection component includes a Hall sensor disposed within the body, and a magnet disposed at a side of the flexible display screen;

the Hall sensor is configured to output a first signal to the control module when the flexible display screen is in the retracted state, and output a second signal to the control module when the flexible display screen is in the expanded state.

In some embodiments, an antenna switch is further disposed within the body;

the primary antenna is in a working state and the spare antenna is in a non-working state when the antenna switch is in a first switch state; and the primary antenna is in a non-working state and the spare antenna is in a working state when the antenna switch is in a second switch state.

According to another aspect of the present disclosure, an antenna control method applied to the mobile terminal as described above is provided. The method includes:

controlling the primary antenna to be in a working state and controlling the spare antenna to be in a non-working state when the flexible display screen is in the retracted state; and controlling the primary antenna to be in a non-working state and controlling the spare antenna to be in a working state when the flexible display screen is in the expanded state.

In some embodiments, the method further includes: controlling the flexible display screen to be in the retracted state or the expanded state according to a type of a foreground application.

In some embodiments, the body is provided with a state detection component thereon; and the method further includes detecting whether the flexible display screen is in the retracted state or in the expanded state according to the state detection component.

According to another aspect of the present disclosure, an antenna control method applied to a mobile terminal as described above is provided. The method includes:

controlling the primary antenna to be in a working state and controlling the spare antenna to be in a non-working state when the antenna switch is in a first switch state; and controlling the primary antenna to be in a non-working state and controlling the spare antenna to be in a working state when the antenna switch is in a second switch state.

According to another aspect of the present disclosure, a computer-readable storage medium is provided. The computer program is stored in the computer-readable storage medium, for implementing the antenna control method according to the above aspect when the computer program is executed by a processor.

It is to be understood that the above general descriptions and the following detailed descriptions are only exemplary and explanatory and not intended to limit the present disclosure.

BRIEF DESCRIPTION OF THE DRAWINGS

The accompanying drawings, which are incorporated in and constitute a part of this disclosure, illustrate embodiments consistent with the present disclosure and, serve to explain some principles of various embodiments of the present disclosure together with the description.

DETAILED DESCRIPTION

Reference will now be made in detail to the exemplary embodiments, examples of which are illustrated in the accompanying drawings. When the following description are related to the accompanying drawings, the same numbers in different drawings represent the same or similar elements unless otherwise indicated. The implementations described in the following exemplary embodiments do not represent all implementations consistent with the present disclosure. Rather, they are only examples of devices and methods consistent with certain aspects of the present disclosure, as detailed in the appended claims.

Various embodiments of the present disclosure can address designing the antenna of the mobile terminal while a structure of the mobile terminal is changed by using the flexible display screen, a new.

Figure 1:
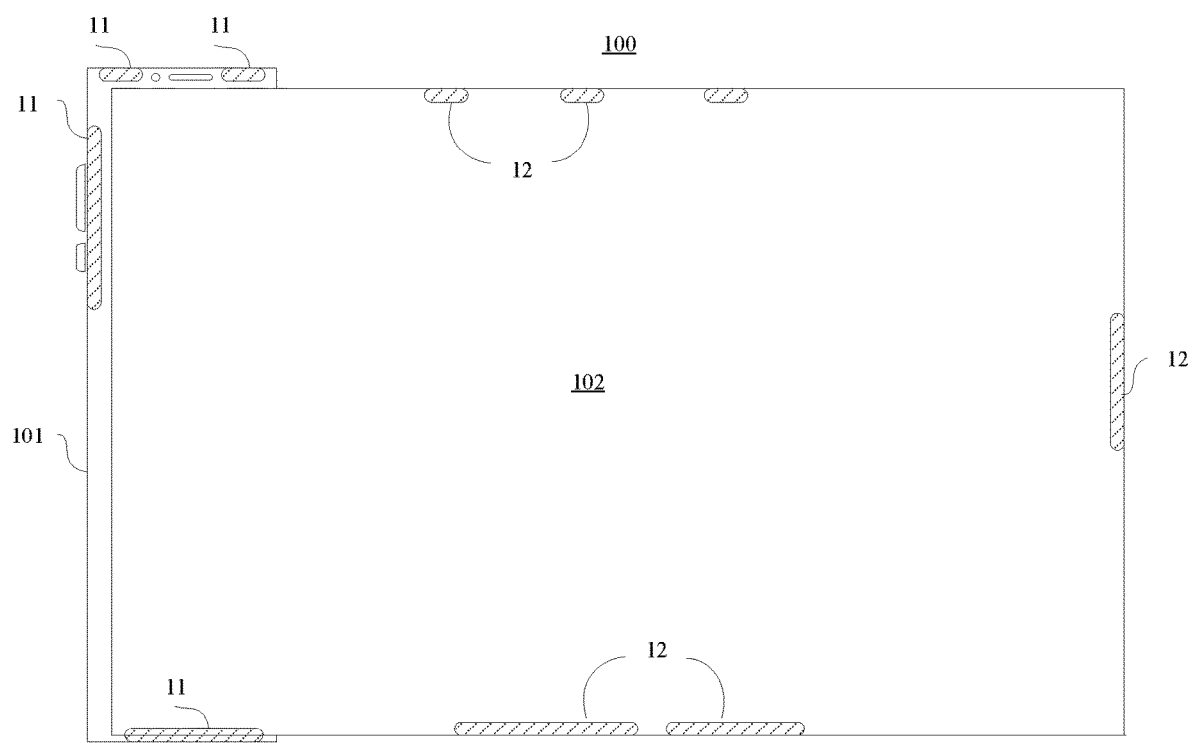
FIG. 1 is a schematic structural view of a mobile terminal according to some embodiments of the present disclosure.

FIG. 1 shows a schematic structural view of a mobile terminal 100 according to some embodiments of the present disclosure. The mobile terminal 100 includes a body 101 and a flexible display screen 102 provided on the body 101;

wherein the flexible display screen 102 is configured to be switched between an expanded state in which the flexible display screen 102 is expanded to a first area and a retracted state in which the flexible display screen 102 is retracted to a second area, and the first area is larger than the second area;

a primary antenna 11 is disposed within the body 101, and a spare antenna 12 for replacing the primary antenna 11 is disposed at an edge of the flexible display screen 102.

As described above, in the mobile terminal provided by this embodiment, the spare antenna is disposed at the edge of the flexible display screen, so that when the state of the flexible display screen is changed, the spare antenna disposed at the edge of the flexible display screen can compensate performance degradation of the primary antenna caused by changes of operating environments, reduce influence of the structural change of the mobile terminal on the antenna transmitting/receiving environment, maintain stability of the antenna performance, and even can improve the antenna performance.

Figure 2:
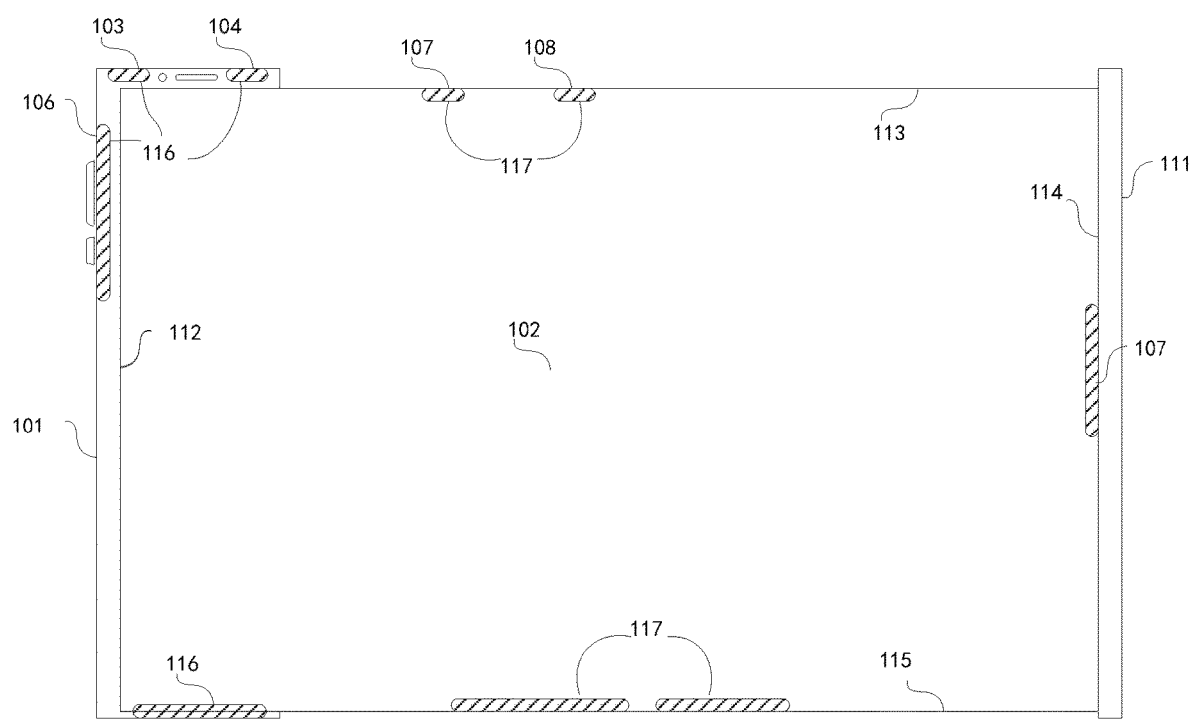
FIG. 2 is a schematic structural view of a mobile terminal when a flexible display screen is in an expanded state according to some other embodiments of the present disclosure.

FIG. 2 is a structural view of a mobile terminal according to some other embodiments of the present disclosure. The mobile terminal includes a body 101, a flexible display screen 102 and a flexible display screen receiving component 111.

Illustratively, the flexible display screen 102 is rectangular. The flexible display screen 102 includes four sequentially connected rectangular sides, that is, a first rectangular edge 112, a second rectangular edge 113, a third rectangular edge 114 and a fourth rectangular edge 115.

Illustratively, a rectangular shape may be a rectangular shape or a rounded rectangular shape.

The first rectangular edge 112 of the flexible display screen 102 is fixed to the body 101. A primary antenna 116 is provided within the body 101. In an example, the primary antenna 116 includes at least one of the following antennas: a GPS receiving antenna 103, a Wi-Fi antenna 104, a main antenna 105, or a diversity antenna 106. The primary antenna 116 simultaneously including these four kinds of antennas is shown in FIG. 2 as an example.

A spare antenna 117 capable of replacing functions of the primary antenna 116 is provided on at least one of the second rectangular edge 113, the third rectangular edge 114, or the fourth rectangular edge 115 of the flexible display screen 102.

The spare antenna 117 can include at least one of the following antennas: a GPS receiving antenna 107, a Wi-Fi antenna 108, a main antenna 109, or a diversity antenna 110. The spare antenna 117 includes one or more of the primary antennas 116. The spare antenna 117 simultaneously including these four kinds of antennas in shown in FIG. 2 as an example.

Figure 3:
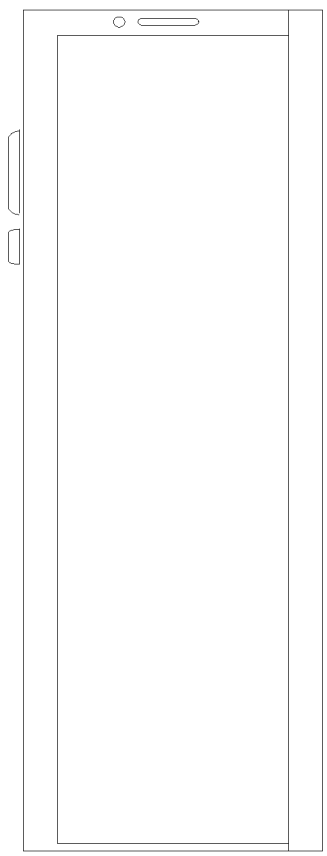
FIG. 3 is a schematic structural view of a mobile terminal when the flexible display screen is in a retracted state according to some other embodiments of the present disclosure.

In an example, the third rectangular edge 114 of the flexible display screen 102 is secured to the flexible display screen receiving component 111. The flexible display screen 102 may be expanded or retracted in the direction of the third rectangular edge 114. FIG. 2 shows a configuration in which the flexible display screen is in an expanded state, and FIG. 3 shows a configuration in which the flexible display screen is in a retracted state.

Figure 4:
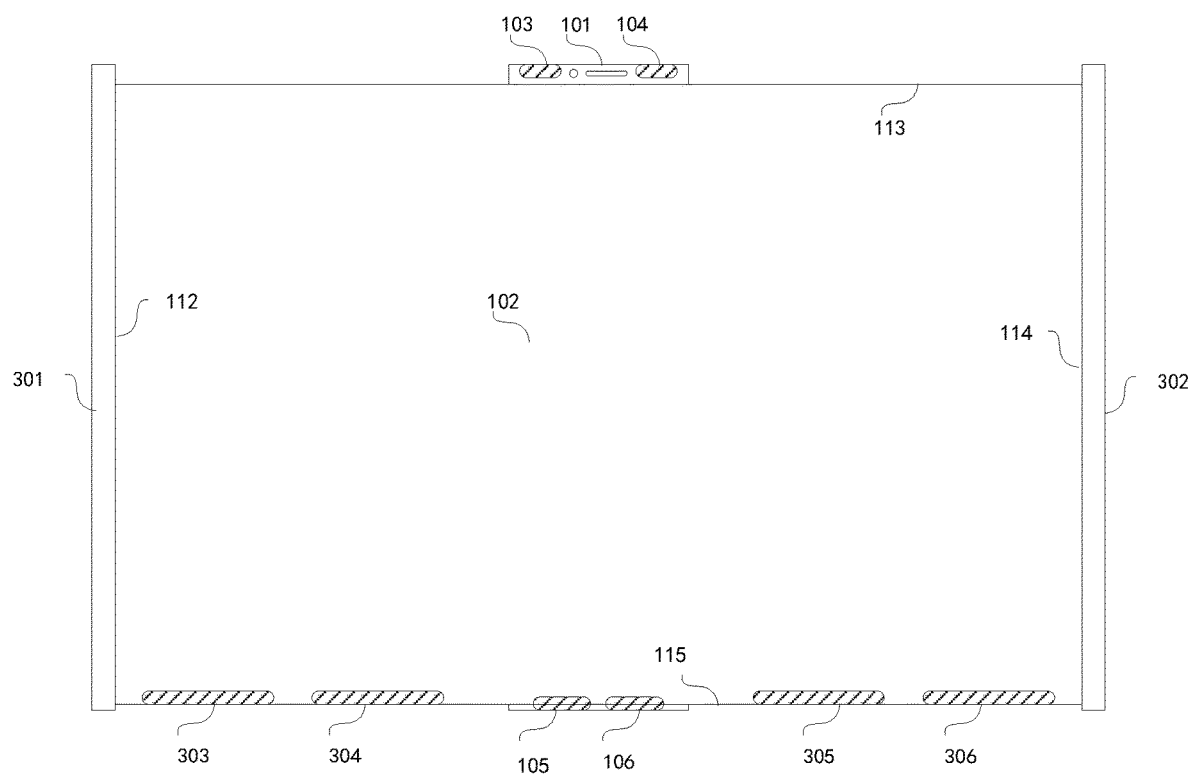
FIG. 4 is a schematic structural view of a mobile terminal according to some other embodiments of the present disclosure.

FIG. 4 is a structural view of a mobile terminal according to some other embodiments of the present disclosure. The differences of this embodiment compared to the exemplary embodiment shown in FIG. 2 are: a central portion of the second rectangular edge 113 and a central portion of the fourth rectangular edge 115 of the flexible display screen 102 are fixed to the body 101, respectively. The first rectangular edge 112 and the second rectangular edge 114 may be movable face to face or back to back.

A spare antenna 117 for replacing the primary antenna 116 is provided on at least one of the first rectangular edge 112, the second rectangular edge 113, the third rectangular edge 114, or the fourth rectangular edge 115 of the flexible display screen 102.

In an example, the spare antennas include a first main antenna 303, a first diversity antenna 304, a second main antenna 305, and a second diversity antenna 306. Correspondingly, the number of the flexible display screen receiving components is two, i.e., a first flexible display screen receiving component 301 and a second flexible display screen receiving component 302. The first rectangular edge 112 of the flexible display screen 102 is secured to the first flexible display screen receiving component 301. The third rectangular edge 114 of the flexible display screen 102 is secured to the second flexible display screen receiving component 302. The flexible display screen 102 may be expanded or retracted in the direction of the first rectangular edge 112 and the third rectangular edge 114 (i.e., in the left-right as shown in the figure) simultaneously or separately.

In various embodiments of the present disclosure, the manner of receiving the flexible display screen is not limited. In an example, the flexible display screen is retracted and expanded in at least two manners: a rolling receiving manner and a folding receiving manner. Two receiving manners are respectively described below with reference to the mobile terminal provided by the exemplary embodiment shown in FIG. 2 as an example.

Figure 5:
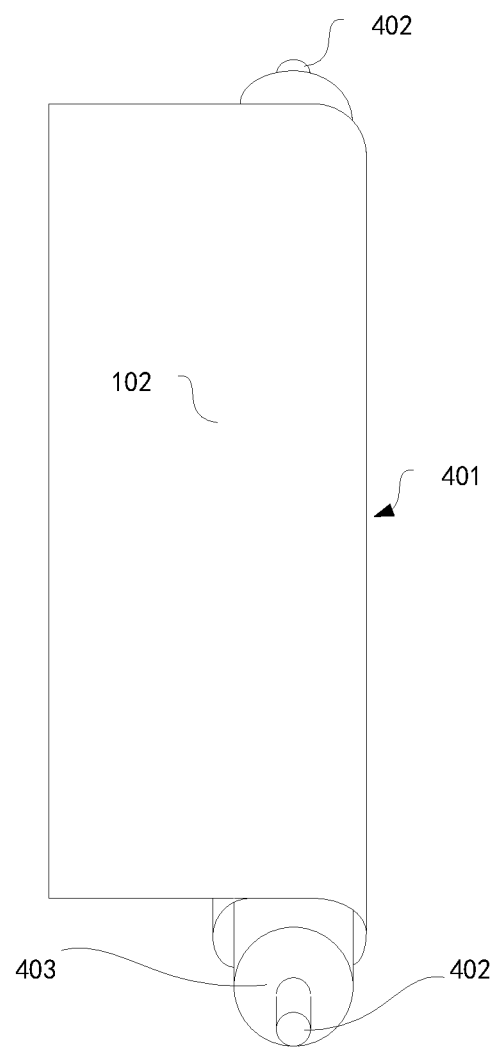
FIG. 5 is a schematic view of a flexible display screen using a rolling receiving structure according to some other embodiments of the present disclosure.

For the rolling receiving manner, a reel 401 is provided within the flexible display screen receiving component 111 (and/or the body 101), and its structure is shown in FIG. 5. Illustratively, the reel 401 is composed of a fixing shaft 402 fixed to upper and lower sides of the flexible display screen receiving component 111 and an outer rotating shaft 403 rotatable around the fixing shaft 402. The third rectangular edge 114 of the flexible display screen 102 is fixed on the outer rotating shaft 403, and the outer rotating shaft 403 rotates to drive the flexible display screen 102 to roll and cover the surface of the outer rotating shaft 403. The flexible display screen receiving component 111 may be pushed inwards or pulled outwards by the user. When the flexible display screen 102 is pushed inwards, the outer rotating shaft 303 is controlled to rotate backwards, so that the flexible display screen 102 is in a retracted state; and when the flexible display screen 102 is pulled outwards, the outer rotating shaft 403 is controlled to rotate forwards to expand the flexible display screen 102.

Figure 6:
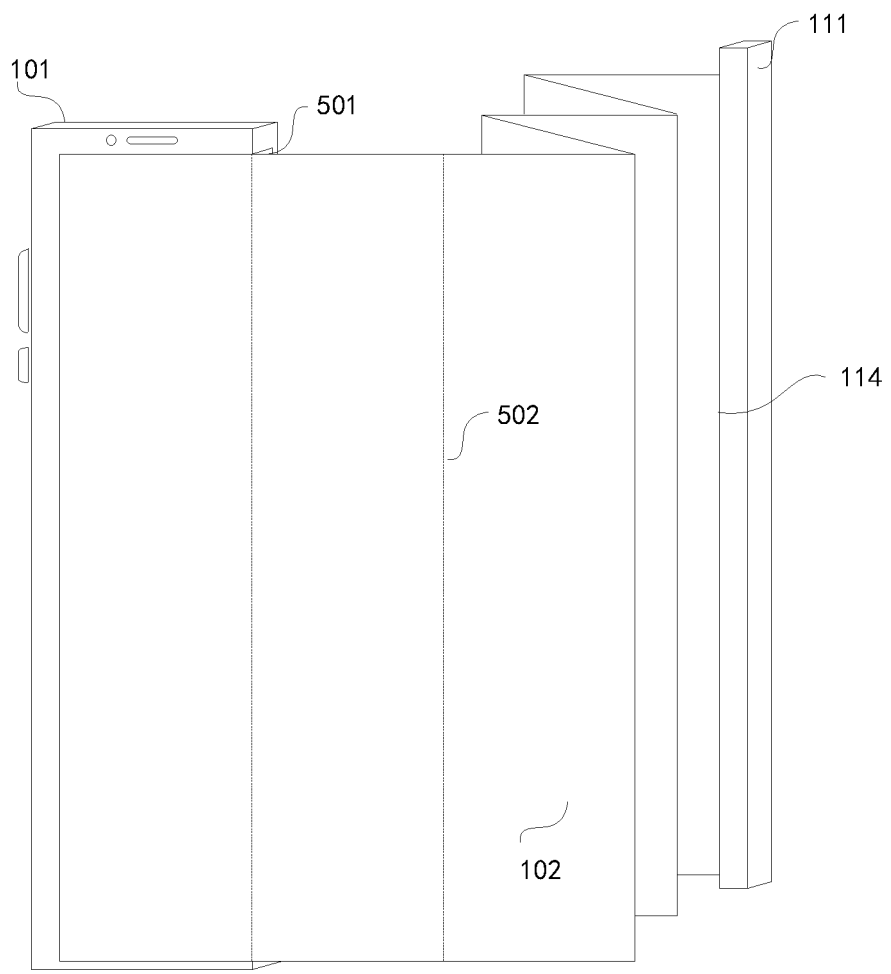
FIG. 6 is a schematic view of a flexible display screen using a folding receiving structure according to some other embodiments of the present disclosure.

For the folding receiving manner, as shown in FIG. 6, the third rectangular edge 114 of the flexible display screen 102 is fixed on the flexible display screen receiving component 111, a flexible display screen receiving groove 501 is provided at a side edge of the body 101, the flexible display screen 102 is equally divided into a plurality of regions by a folding line 502, and after the flexible display screen 102 is sequentially folded along the folding line 502, the flexible display screen 102 may be placed into the flexible display screen receiving groove 501, so that the flexible display screen 102 is retracted. The flexible display screen receiving component 111 is pulled to take the flexible display screen 102 out of the flexible display screen receiving groove 501, so that the flexible display screen 102 is expanded.

In the above embodiments, generally, the control module located inside the body 101 is further included, and the control module may be a CPU or a microprocessor. The control module is electrically connected with antennas, respectively.

The various device components, circuits, modules, units, blocks, or portions may have modular configurations, or are composed of discrete components, but nonetheless can be referred to as "modules" in general. In other words, the "components," "circuits," "modules," "blocks," "portions," or "units" referred to herein may or may not be in modular forms.

Based on the above embodiments, switching of working states between the primary antenna 116 and the spare antenna 117 can be realized in at least one of the following three forms:

a first form: a software control mode;

a second form: a control mode of combining software and hardware; or a third form: a control mode of a hardware switch.

These three modes can be illustrated in the three different embodiments below.

Figure 7:
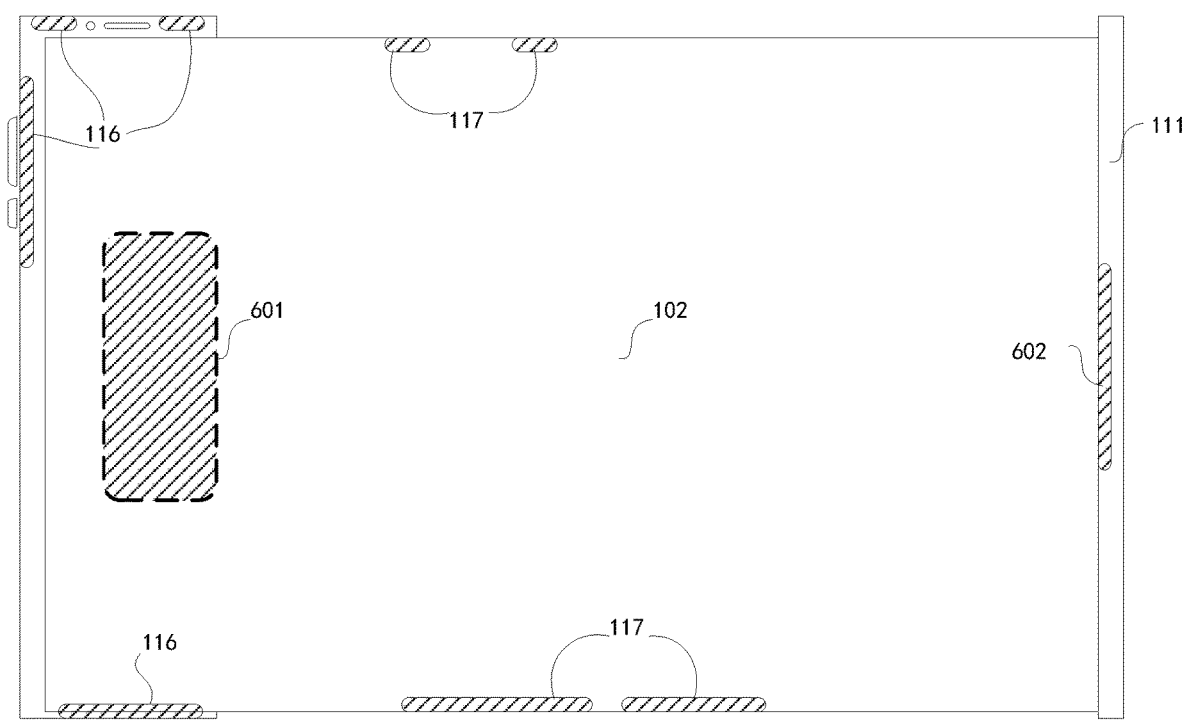
FIG. 7 is a schematic structural view of a mobile terminal according to some other embodiments of the present disclosure.

FIG. 7 is a structural view of a mobile terminal according to some other embodiments of the present disclosure. Based on the exemplary embodiment shown in FIG. 2, a control module 601 is added into the body 101 and a driving module 602 is added to the flexible display screen receiving component 111. The control module 601 is connected to the driving module 602, the primary antenna 116 and the spare antenna 117, respectively. The driving module 602 is an electromechanical component in the form of electric driving.

In an example, the control module 601 includes at least one of three functions of: 1. identifying a category of the foreground application; 2. controlling operation and stop of the driving module 602; or 3. controlling the primary antenna 116 to be in the working state and controlling the spare antenna 117 to be in the non-working state when the flexible display screen 102 is in the retracted state; and controlling the primary antenna 116 to be in the non-working state and controlling the spare antenna 117 to be in the working state when the flexible display screen 102 is in the expanded state.

The driving module 602 may drive the flexible display receiving component 111 to rotate forwards to expand the flexible display screen 102 or rotate backwards to receive the flexible display screen 102.

In an example, when the control module 601 identifies the category of the foreground application as a game, a video, a reading or other preset program category, the control module 601 sends a first instruction to the driving module 602, and the first instruction is used for controlling the driving module 602 to drive the flexible display screen receiving component 111 to rotate forwards to expand the flexible display screen 102, so that the flexible display screen 102 is in the expanded state. The control module 601 sends a second instruction to the primary antenna 116 and the spare antenna 117, and the second instruction is used for controlling the primary antenna 116 and the spare antenna 117 to switch their working states, such that the primary antenna 116 is in the non-working state and the spare antenna 117 is in the working state.

In an example, when the control module 601 identifies the category of the foreground application as a game, a video, a reading or other preset program category, the control module 601 sends a third instruction to the driving module 602, and the third instruction is used for controlling the driving module 602 to drive the flexible display screen receiving component 111 to rotate backwards to receive the flexible display screen 102, so that the flexible display screen 102 is in the retracted state. The control module 601 sends a fourth instruction to the primary antenna 116 and the spare antenna 117, and the fourth instruction is used for controlling the primary antenna 116 and the spare antenna 117 to switch their working states, such that the primary antenna 116 is in the working state and the spare antenna 117 is in the non-working state.

As described above, the mobile terminal provided by this embodiment can intelligently control the state of the flexible display screen 102 and control the working states of the primary antenna 116 and the spare antenna 117 by identifying the foreground application. When a specific foreground program is used, the mobile terminal can automatically expand or receive the flexible display screen 102, so as to provide good use experience for a user, and meanwhile, the working states of the primary antenna 116 and the spare antenna 117 are automatically switched, so that the mobile terminal always keeps good antenna performance, and the mobile terminal is more convenient to be used.

Figure 8:
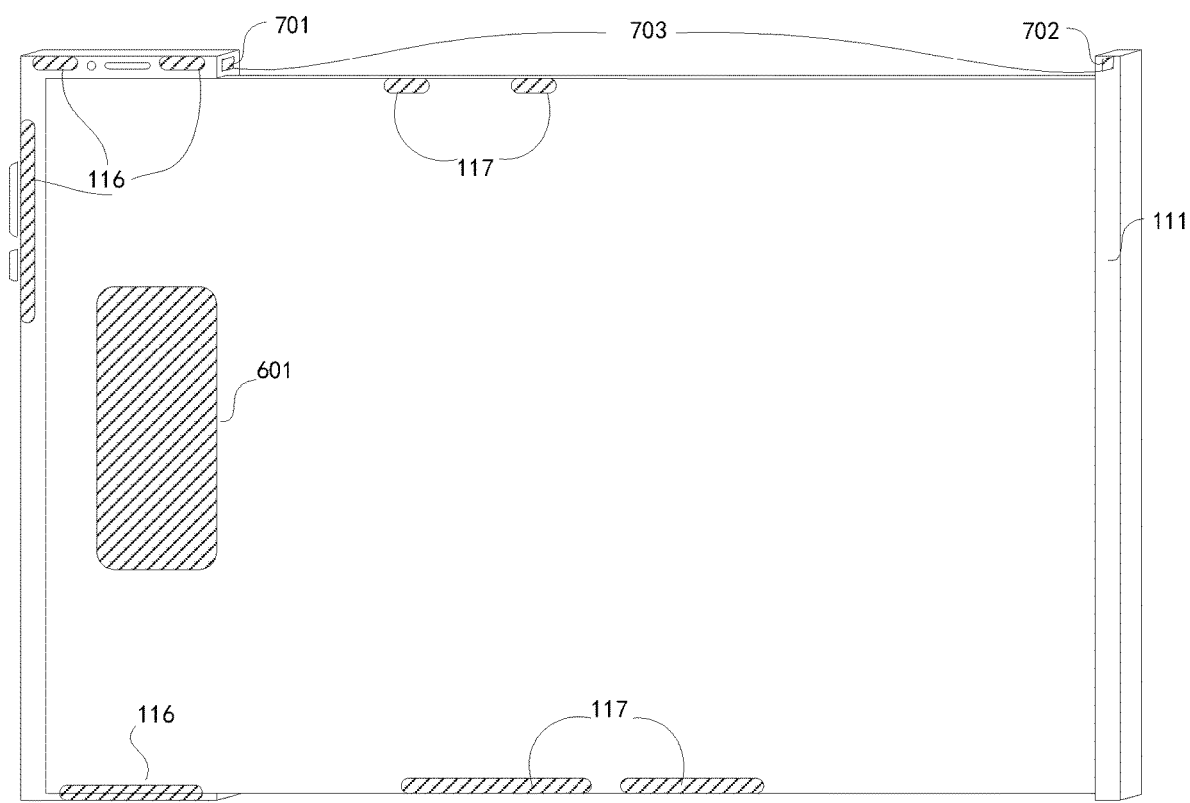
FIG. 8 is a schematic view of a mobile terminal when the flexible display screen is in the expanded state according to some other embodiments of the present disclosure.

FIG. 8 is a structural view of a mobile terminal according to some other embodiments of the present disclosure. A control module 601 and a state detection component 703 are added to the exemplary embodiment shown in FIG. 2. The state detection component 703 includes a Hall sensor 701 and a magnet 702.

Illustratively, the control module 601 and the Hall sensor 701 are disposed within the body 101, and a magnet 702 is added to the flexible display screen receiving component 111. The control module 601 is connected to the Hall sensor 701, the primary antenna 116, and the spare antenna 117, respectively.

The control module 601 can have two functions: 1. identifying a signal output by the Hall sensor 701; 2. controlling the primary antenna 116 to be in the working state and controlling the spare antenna 117 to be in the non-working state when the flexible display screen 102 is in the retracted state; and controlling the primary antenna 116 to be in the non-working state and controlling the spare antenna 117 to be in the working state when the flexible display screen 102 is in the expanded state.

Figure 9:
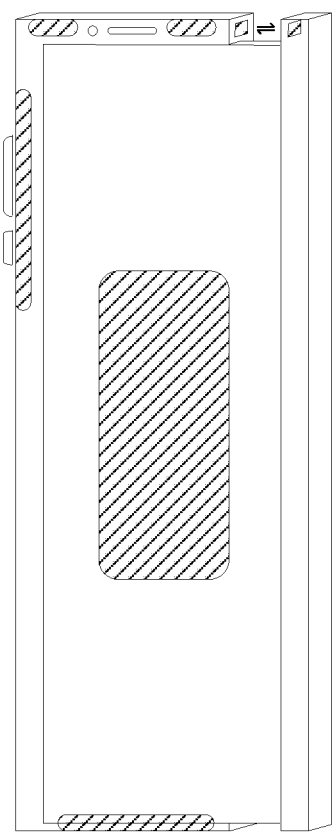
FIG. 9 is a schematic view of a mobile terminal when the flexible display screen is in the retracted state according to some other embodiments of the present disclosure.

The state detection component 703 may detect a state of the flexible display screen 102. Specifically, when the flexible display screen 102 is in the retracted state as shown in FIG. 9, the magnet 702 is close to the Hall sensor 701, the magnetic field around the Hall sensor 701 is increased, and at this time, the Hall sensor 701 outputs a first signal; when the flexible display screen 102 is in the expanded state as shown in FIG. 8, the magnet 702 is far away from the Hall sensor 701, the magnetic field around the Hall sensor 701 is weakened, and at this time, the Hall sensor 701 outputs a second signal.

When the control module 601 identifies the first signal output by the Hall sensor 701, the flexible display screen 102 is in the retracted state, the control module 601 sends a fourth instruction to the primary antenna 116 and the spare antenna 117, and controls the primary antenna 116 and the spare antenna 117 to switch their working states such that the primary antenna 116 is in the working state and the spare antenna 117 is in the non-working state.

When the control module 601 identifies that the Hall sensor 701 outputs the second signal, the flexible display screen 102 is in the expanded state, the control module 601 sends a second instruction to the primary antenna 116 and the spare antenna 117, and controls the primary antenna 116 and the spare antenna 117 to switch their working states such that the primary antenna 116 is in the non-working state and the spare antenna 117 is in the working state.

As described above, the mobile terminal provided by this embodiment can automatically control the working states of the primary antenna 116 and the spare antenna 117 by identifying the state of the flexible display screen. When the flexible display screen is expanded or retracted, the antenna is automatically switched into a more suitable working state, so that the user can have good use experience, and also, excellent antenna performances of the mobile terminal can be ensured.

Figure 10:
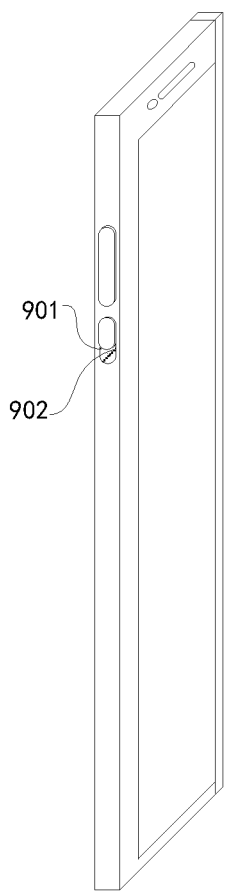
FIG. 10 is a schematic structural view of a mobile terminal when an antenna switch is in a first state according to some other embodiments of the present disclosure.

FIG. 10 is a structural view of a mobile terminal according to some other embodiments of the present disclosure. An antenna switch 901 is added to the body based on the exemplary embodiment shown in FIG. 2. The antenna switch 901 is connected to the primary antenna 116 and the spare antenna 117, respectively.

The antenna switch 901 may control switching of two working states of the primary antenna 116 and the spare antenna 117.

As shown in FIG. 10, when the antenna switch 901 is in a first state 902, the primary antenna 116 is controlled to be in the working state and the spare antenna 117 is controlled to be in the non-working state.

Figure 11:
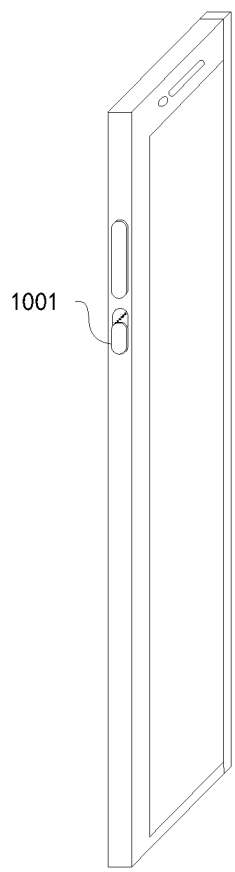
FIG. 11 is a schematic structural view of a mobile terminal when the antenna switch is in a second state according to some other embodiments of the present disclosure.

As shown in FIG. 11, when the antenna switch 901 is in a second state 1001, the primary antenna 116 is controlled to be in the non-working state and the spare antenna 117 is controlled to be in the working state.

As described above, the mobile terminal provided by this embodiment can change the working states of the primary antenna 116 and the spare antenna 117 by manually changing the state of the antenna switch 901. When the mobile terminal operates in complex use environments, the antenna switch provides a user with a space to autonomously select an antenna. The user can randomly select one group of antennas from the primary antennas 116 and the spare antennas 117, so that the mobile terminal can adapt to the complex use environments, the antenna performance of the mobile terminal can be ensured, and the user's experience can be improved.

Figure 12:
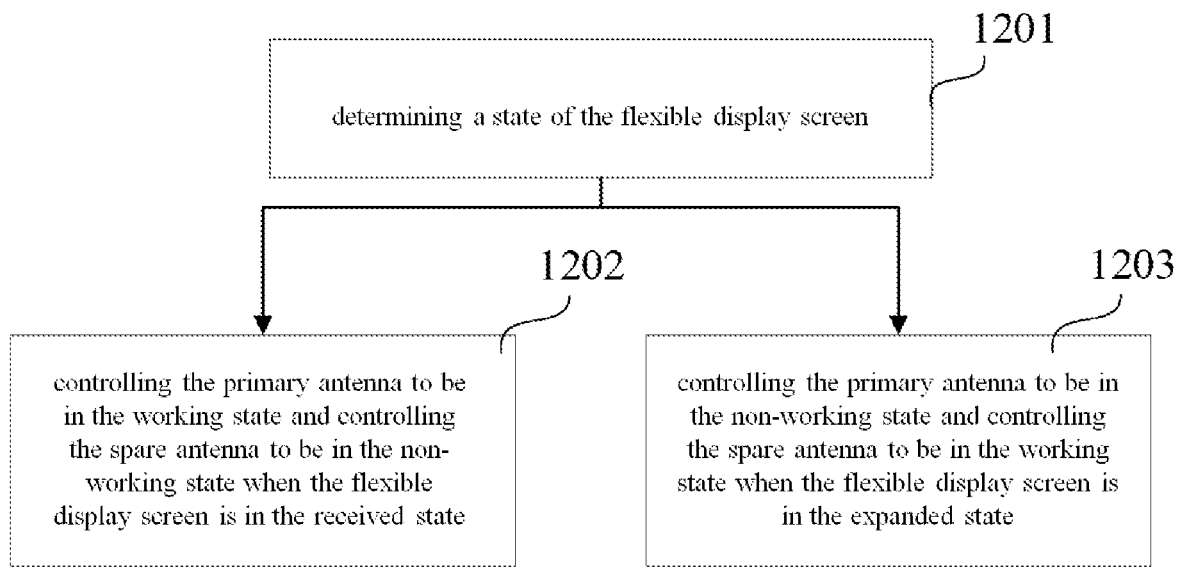
FIG. 12 is a flowchart of an antenna control method according to some embodiments of the present disclosure.

FIG. 12 is a flowchart of an antenna control method according to some embodiments of the present disclosure.

This embodiment is illustrated as an example that the method is applied to the mobile terminal shown in FIG. 7. The method can include:

step 1201: determining a state of the flexible display screen 102;

if the flexible display screen 102 is in the retracted state, step 1202 is performed; and if the flexible display screen 102 is in the expanded state, step 1203 is performed;

step 1202: controlling the primary antenna 116 to be in the working state and controlling the spare antenna 117 to be in the non-working state when the flexible display screen 102 is in the retracted state;

step 1203: controlling the primary antenna 116 to be in the non-working state and controlling the spare antenna 117 to be in the working state when the flexible display screen 102 is in the expanded state.

As described above, the antenna control method provided by this embodiment provides an antenna automatic control method for automatically switching working states of the primary antenna 116 and the spare antenna 117 according to different states of the flexible display screen 102. By using the control method, the antenna may be automatically switched into a more suitable working state when the flexible display screen is expanded or retracted, so that the user can have good use experiences, and also excellent antenna performances of the mobile terminal can be ensured.

In the above embodiments of the antenna automatic control method, there may be various methods for determining the state of the flexible display screen 102. Illustratively, the method for determining the state of the flexible display screen 102 may be identifying the state of the flexible display screen 102 by identifying software instructions, or identifying the state of the flexible display screen 102 by setting hardware.

In an example, the software mode for sensing the state of the flexible display screen 102 may be implemented to identify the state of the flexible display screen 102 by identifying control instructions of the control module 601.

In an example, the hardware mode for sensing the state of the flexible display screen 102 may be implemented to identify the state of the flexible display screen 102 by providing one or more of a state detection component 703, a sensor, and a mechanical component having sensing functions disposed on the mobile terminal.

The following two working modes are described in two different embodiments:

a first embodiment, i.e., an exemplary embodiment of controlling an antenna by using software; and a second embodiment, i.e., an exemplary embodiment of controlling the antenna by using a combination of software and hardware.

Figure 13:
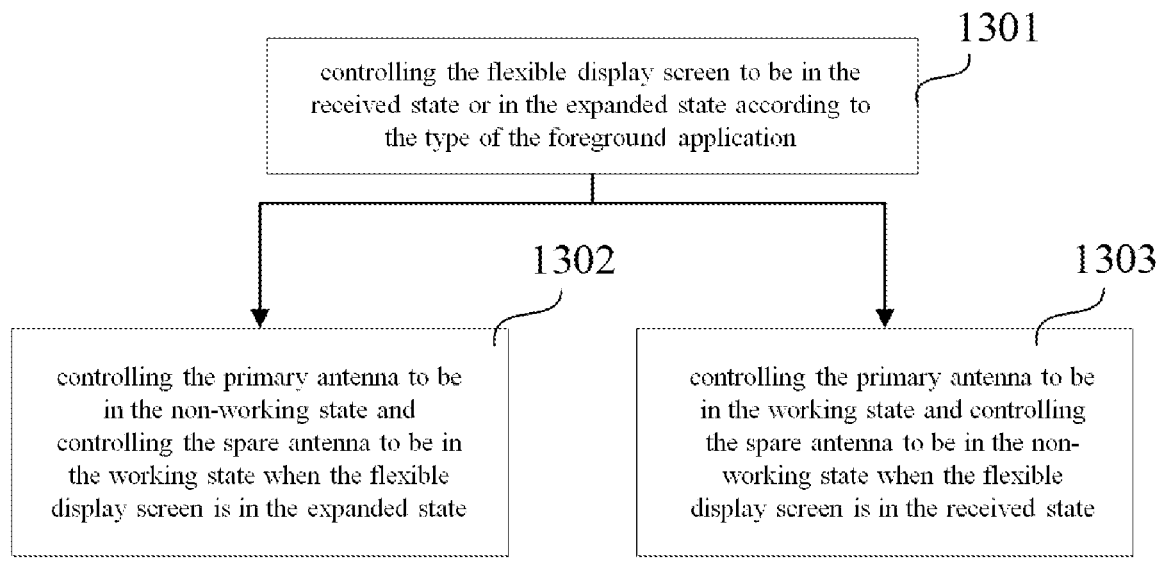
FIG. 13 is a flowchart of an antenna control method according to some other embodiments of the present disclosure.

FIG. 13 is a flowchart of an antenna control method according to some embodiments of the present disclosure, which is illustrated as an example that the method is applied to the mobile terminal shown in FIG. 7. The method may include:

Step 1301: controlling the flexible display screen 102 to be in the retracted state or in the expanded state according to the type of the foreground application;

the control module 601 identifies whether the category of the foreground application is a game, a video, a reading or other preset program category, and if yes, step 1302 is performed; if no, step 1303 is performed.

Step 1302: controlling the primary antenna 116 to be in the non-working state and controlling the spare antenna 117 to be in the working state when the flexible display screen 102 is in the expanded state;

in an example, the control module 601 sends a first instruction to the driving module 602 to expand the flexible display screen 102, sends a second instruction to the primary antenna 116 and the spare antenna 117, and controls the primary antenna 116 and the spare antenna 117 to switch their working states such that the primary antenna 116 is in the non-working state and the spare antenna 117 is in the working state.

Step 1303: controlling the primary antenna 116 to be in the working state and controlling the spare antenna 117 to be in the non-working state when the flexible display screen 102 is in the retracted state.

In an example, the control module 601 sends a third instruction to the driving module 602 to receive the flexible display screen 102, sends a fourth instruction to the primary antenna 116 and the spare antenna 117, and controls the primary antenna 116 and the spare antenna 117 to switch their working states such that the primary antenna 116 is in the working state and the spare antenna 117 is in the non-working state.

As described above, the control method provided by this embodiment provides a method for intelligently controlling a state of the flexible display screen 102 and simultaneously controlling working states of the primary antenna 116 and the spare antenna 117 by identifying a foreground application. Combined with the foreground program to control the operation of the antenna, the mobile terminal automatically expands or receives the flexible display screen 102 when a specific foreground program is used, so that good use experience is provided for the user, and meanwhile, the working states of the primary antenna 116 and the spare antenna 117 are automatically switched, such that the mobile terminal can always keep good antenna performance to be used more conveniently.

Figure 14:
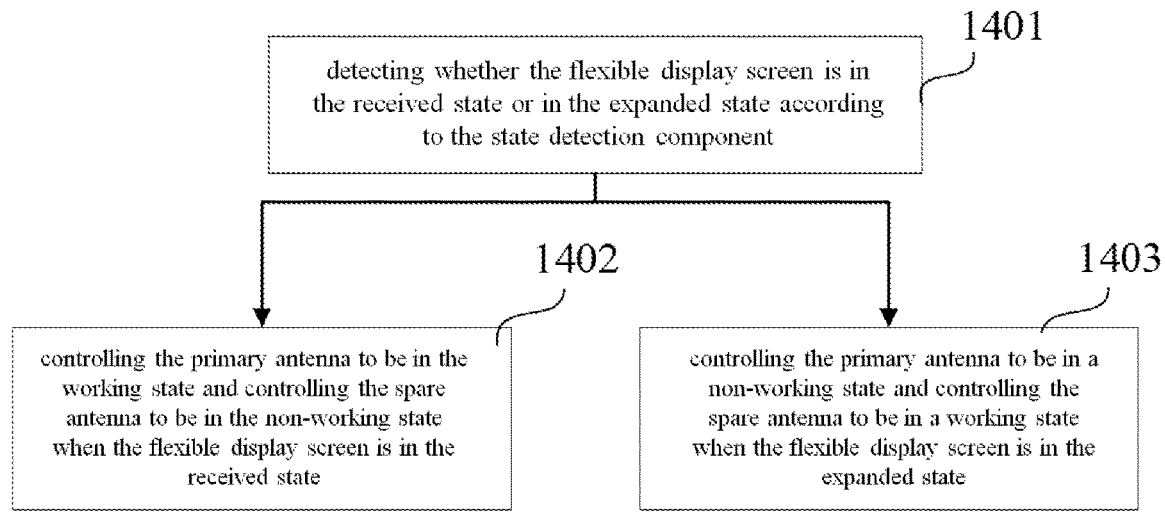
FIG. 14 is a flowchart of an antenna control method according to some other embodiments of the present disclosure.

FIG. 14 is a flowchart of an antenna control method according to some embodiments of the present disclosure. The present embodiment is illustrated as an example that the method is applied to the mobile terminal shown in FIG. 8, and the method may include:

Step 1401: detecting whether the flexible display screen 102 is in the retracted state or in the expanded state according to the state detection component 703.

In an example, the control module 601 identifies the state of the flexible display screen 102 detected by the state detection component 703. If the flexible display screen 102 is in the retracted state, step 1402 is performed; and if the flexible display screen 102 is in the expanded state, step 1403 is performed.

Step 1402: controlling the primary antenna 116 to be in the working state and controlling the spare antenna 117 to be in the non-working state when the flexible display screen 102 is in the retracted state;

In an example, the control module 601 sends a fourth instruction to the primary antenna 116 and the spare antenna 117, and controls the primary antenna 116 and the spare antenna 117 to switch their working states such that the primary antenna 116 is in the working state and the spare antenna 117 is in the non-working state.

Step 1403: controlling the primary antenna 116 to be in a non-working state and controlling the spare antenna 117 to be in a working state when the flexible display screen 102 is in the expanded state.

In an example, the control module 601 sends a second instruction to the primary antenna 116 and the spare antenna 117, and controls the primary antenna 116 and the spare antenna 117 to switch their working states such that the non-working state of the primary antenna 116 and the working state of the spare antenna 117.

As described above, the antenna control method provided by this embodiment provides a method for controlling the working states of the primary antenna 116 and the spare antenna 117 by identifying whether the flexible display screen 102 is in the retracted or expanded state through the state detection component 703. The state detection component 703 is employed to detect the state of the flexible display screen 102, and may transmit the state of the flexible display screen 102 to the control module 601 in real time, so that the sensitivity of the mobile terminal to the state of the flexible display screen 102 can improved, and furthermore the accuracy of controlling of the primary antenna 116 and the spare antenna 117 can be improved, and the excellent antenna performance of the mobile terminal at any time can be ensured.

According to the embodiments of the antenna control method, the working states of the primary antenna 116 and the spare antenna 117 can be automatically adjusted when the state of the flexible display screen 102 is changed, so that the primary antenna 116 and the spare antenna 117 are always operated in a proper working environment, and the good antenna performance of the mobile terminal can be maintained. One embodiment hereinafter is provided to illustrate of the manual control method.

Figure 15:
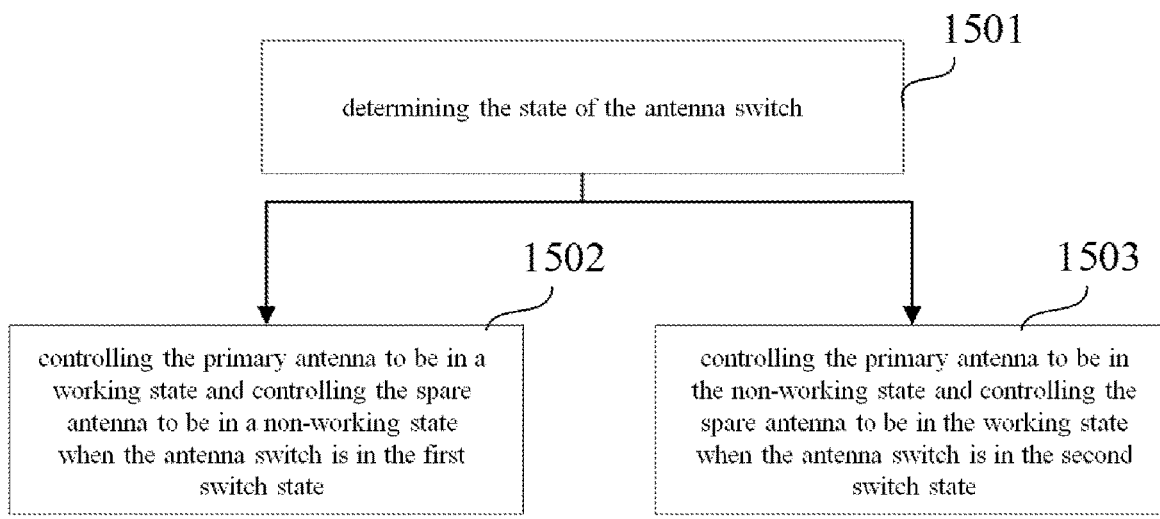
FIG. 15 is a flowchart of an antenna control method according to some other embodiments of the present disclosure.

FIG. 15 is a flowchart of an antenna control method according to some embodiments of the present disclosure, which is illustrated as an example that the method is applied to the mobile terminal shown in FIG. 10. The method includes:

Step 1501: determining the state of the antenna switch 901.

If the antenna switch 901 is in the first state 902, step 1502 is performed; and if the antenna switch 901 is in the second state 1001, step 1503 is performed.

Step 1502: controlling the primary antenna 116 to be in a working state and controlling the spare antenna 117 to be in a non-working state.

Step 1503: controlling the primary antenna 116 to be in the non-working state and controlling the spare antenna 117 to be in the working state.

As described above, the antenna control method provided by this embodiment provides a method for switching the working states of the primary antenna 116 and the spare antenna 117 by controlling the antenna switch 901. When the mobile terminal works in complex use environments, the antenna switch provides the user with a space to autonomously select an antenna. The user may randomly select one group of antennas from the primary antennas 116 and the spare antennas 117, so that the mobile terminal can adapt to the complex use environment, the antenna performance of the mobile terminal can be ensured, and the use experience of the user can be improved.

Various embodiments of the present disclosure also provide a computer-readable storage medium in which at least one instruction, at least one segment of a program, a code set, or an instruction set is stored, the at least one instruction, the at least one segment of the program, the code set, or the instruction set is loaded and executed by a processor to implement the antenna control method provided in the above embodiments of the method.

Various embodiments of the present disclosure can have one or more of the following advantages.

By providing the spare antenna at the edge of flexible display screen, when the flexible display screen state changes, the antenna provided at the edge of the flexible display screen can compensate the performance degradation of the primary antenna caused by changes of operating environments, reduce the influence of the structural change of the mobile terminal on the antenna transmitting/receiving environment, maintain the stability of the antenna performance, and even promote the antenna performance.

It should be understood that "a plurality" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are an "or" relationship.

Other embodiments of the invention will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

In some embodiments, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or retracted from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), LCD (liquid-crystal display), OLED (organic light emitting diode) displays, or any other types of monitors for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present disclosure is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A mobile terminal comprising:
a body, and a flexible display screen disposed over the body; wherein
the flexible display screen is configured to be switchable between an expanded state in which the flexible display screen is expanded to a first area, and a retracted state in which the flexible display screen is retracted to a second area, the first area being larger than the second area; and
a primary antenna in the body, and a spare antenna at at least one flexible edge of the flexible display screen and configured to replace functions of the primary antenna, wherein the flexible display screen is capable of being received and rolled by pushing or pulling, and at least a part of the at least one flexible edge and the spare antenna thereon are received within a receiving space of the body when the flexible display screen is in a retracted state; wherein
a control module is further disposed within the body;
the control module is respectively connected with the primary antenna and the spare antenna;
the control module is configured to:
control the flexible display screen to be in the retracted state or in the expanded state according to a type of a foreground application, and automatically control the working states of the primary antenna and the spare antenna by identifying the state of the flexible display screen;
control the primary antenna to be in a working state and control the spare antenna to be in a non-working state when the flexible display screen is in the retracted state; and
control the primary antenna to be in a non-working state and control the spare antenna to be in a working state when the flexible display screen is in the expanded state.

2. The mobile terminal according to claim 1, wherein the flexible display screen is rectangular, and a first rectangular edge of the flexible display screen is secured to the body; and
wherein the spare antenna is disposed on at least one of a second rectangular edge, a third rectangular edge, or a fourth rectangular edge of the flexible display screen.

3. The mobile terminal according to claim 1, wherein the flexible display screen is rectangular, a central portion of a second rectangular edge of the flexible display screen is secured to the body, and a central portion of a fourth rectangular edge of the flexible display screen is secured to the body; wherein the second rectangular edge and the fourth rectangular edge are two parallel rectangular edges; and wherein the spare antenna is disposed on at least one of a first rectangular edge, the second rectangular edge, a third rectangular edge, or the fourth rectangular edge of the flexible display screen.

4. The mobile terminal according to claim 1, wherein the primary antenna comprises at least one of a primary antenna, a diversity antenna, a Global Positioning System (GPS) receiving antenna, or a wireless fidelity (Wi-Fi) antenna.

5. The mobile terminal according to claim 4, wherein the spare antenna comprises one or more primary antennas.

6. The mobile terminal according to claim 1, wherein the body is provided with a state detection component; the control module is connected with the state detection component; and the control module is configured to determine whether the flexible display screen is in the retracted state or in the expanded state according to a signal output by the state detection component.

7. The mobile terminal according to claim 6, wherein the state detection component comprises a Hall sensor disposed within the body, and a magnet disposed at a side of the flexible display screen;

wherein the Hall sensor is configured to output a first signal to the control module when the flexible display screen is in the retracted state, and output a second signal to the control module when the flexible display screen is in the expanded state.

8. The mobile terminal according to claim 1, wherein an antenna switch is further disposed within the body;

wherein the primary antenna is in a working state and the spare antenna is in a non-working state when the antenna switch is in a first switch state; and wherein the primary antenna is in a non-working state and the spare antenna is in a working state when the antenna switch is in a second switch state.

9. An antenna control method, wherein the antenna control method is applied to a mobile terminal according to claim 8, and comprises:

controlling the primary antenna to be in a working state and controlling the spare antenna to be in a non-working state when the antenna switch is in a first switch state; and controlling the primary antenna to be in a non-working state and controlling the spare antenna to be in a working state when the antenna switch is in a second switch state.

10. An antenna control method, wherein the antenna control method is applied to a mobile terminal comprising:

a body, and a flexible display screen disposed over the body; wherein the flexible display screen is configured to be switchable between an expanded state in which the flexible display screen is expanded to a first area, and a retracted state in which the flexible display screen is retracted to a second area, the first area being larger than the second area; and a primary antenna in the body, and a spare antenna at at least one flexible edge of the flexible display screen and configured to replace functions of the primary antenna, wherein the flexible display screen is capable of being received and rolled by pushing or pulling, and at least a part of the at least one flexible edge and the spare antenna thereon are received within a receiving space of the body when the flexible display screen is in a retracted state, and wherein the method comprises:

controlling the flexible display screen to be in the retracted state or in the expanded state according to a type of a foreground application, and automatically controlling the working states of the primary antenna and the spare antenna by identifying the state of the flexible display screen, comprising:

controlling the primary antenna to be in a working state and controlling the spare antenna to be in a non-working state when the flexible display screen is in the retracted state; and controlling the primary antenna to be in a non-working state and controlling the spare antenna to be in a working state when the flexible display screen is in the expanded state.

11. The method according to claim 10, wherein the body is provided with a state detection component; and wherein the method further comprises:

detecting whether the flexible display screen is in the retracted state or in the expanded state according to the state detection component.

12. A mobile terminal comprising:

a body, and a flexible display screen disposed over the body; wherein the flexible display screen is configured to be switchable between an expanded state in which the flexible display screen is expanded to a first area, and a retracted state in which the flexible display screen is retracted to a second area, the first area being larger than the second area; and a primary antenna in the body, and a spare antenna at at least one flexible edge of the flexible display screen and configured to replace functions of the primary antenna, wherein the flexible display screen is capable of being received and rolled by pushing or pulling, and at least a part of the at least one flexible edge and the spare antenna thereon are received within a receiving space of the body when the flexible display screen is in a retracted state, wherein the spare antenna at the edge of flexible display screen is configured to compensate performance degradation of the primary antenna caused by changes of antenna transmitting/receiving environment responsive to the flexible display screen changing states;

the mobile terminal is a mobile phone, and the flexible display screen comprises an organic light-emitting diode (OLED) display screen;

the mobile terminal further comprises:

a non-transitory computer-readable storage medium having instructions stored thereon for execution by a processing circuit to realize controlling the primary antenna to be in a non-working state and controlling the spare antenna to be in a working state responsive to that the flexible display screen is in the expanded state; and a controller configured to:

control the flexible display screen to be in the retracted state or in the expanded state according to a type of a foreground application, and automatically control the working states of the primary antenna and the spare antenna by identifying the state of the flexible display screen;

control the primary antenna to be in a working state and control the spare antenna to be in a non-working state when the flexible display screen is in the retracted state; and control the primary antenna to be in a non-working state and control the spare antenna to be in a working state when the flexible display screen is in the expanded state.

13. The mobile terminal according to claim 12, further comprising a state detector configured to detect whether the flexible display screen is in the expanded state or the retracted state.

14. The mobile terminal according to claim 13, further comprising a controller configured to control the flexible display screen to be in the retracted state or in the expanded state based on whether the flexible display screen is in the retracted state or in the expanded state as detected by the state detector.

* * * * *